US006499037B1

United States Patent
Breitbart et al.

(10) Patent No.: US 6,499,037 B1
(45) Date of Patent: Dec. 24, 2002

(54) SYSTEM AND METHOD FOR SERIALIZING UPDATES TO ANCESTOR SITES IN A DISTRIBUTED DATABASE

(75) Inventors: Yuri J. Breitbart, Scotch Plains, NJ (US); Raghavan V. Komondoor, Madison, WI (US); Rajeev Rastogi, New Providence, NJ (US); Srinivasan Seshadri, Basking Ridge, NJ (US); Abraham Silberschatz, Warren, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/391,991

(22) Filed: Sep. 9, 1999

(51) Int. Cl.⁷ .............................................. G06F 17/30
(52) U.S. Cl. ...................... 707/103 R; 707/10; 707/102; 707/104.1
(58) Field of Search .............................. 707/8, 201, 10, 707/103.1, 702, 104.1, 203, 101, 100, 5, 1

(56) References Cited

U.S. PATENT DOCUMENTS

| | | | | |
|---|---|---|---|---|
| 5,581,753 A | * | 12/1996 | Terry et al. | |
| 5,596,754 A | * | 1/1997 | Lomet | |
| 5,768,594 A | * | 6/1998 | Blelloch et al. | |
| 5,802,322 A | * | 9/1998 | Niblett | |
| 5,808,625 A | * | 9/1998 | Picott et al. ................. | 345/440 |
| 5,864,851 A | * | 1/1999 | Breitbart et al. ............... | 707/8 |
| 5,999,931 A | * | 12/1999 | Breitbart et al. ............... | 707/10 |
| 6,031,548 A | * | 2/2000 | Gueziec et al. .............. | 345/440 |
| 6,298,228 B1 | * | 10/2001 | Singh ......................... | 455/403 |

OTHER PUBLICATIONS

Jim Gray, pat Helland, Patrick O'Neil, Dennis Shasha. *The Dangers of Replication and a Solution*. SIGMOD '96 6/96 Montreal Canada @1996 ACM 0–89791–794.*

Parvathi Chundi, Daniel J. Rosenkrantz, S. S. Ravi. Department of Computer Science, University at Albany—State University of New York. *Deffered Updates and Data Placement in Distributed Databases*. Research Supported by NSF Grant CCR–90–06396.

J. Gray and A. Reuter, *Transaction Processing: Concepts and Tecniques*, Chapter 7: Isolation Concepts, pp. 375, 390–391. Morgan–Kaufmann Publishers, San Mateo, CA, 1993.

* cited by examiner

Primary Examiner—Jean M. Corrielus
Assistant Examiner—Tam V Nguyen
(74) Attorney, Agent, or Firm—Hitt, Gaines & Boisbrun

(57) ABSTRACT

A system for, and method of, ensuring serialization of updates from a replica site in a distributed database that is described by a copy graph and a distributed database incorporating the system or the method. In one embodiment, the system includes: (1) a directed acyclic copy graph (DAG) creation module that identifies backedges in, and removes the backedges from, the copy graph to yield a DAG and (2) a propagation module, associated with the DAG creation module, that initially employs eager updating to propagate the updates along the backedges and thereafter employs lazy updating to propagate the updates along edges of the directed acyclic copy graph to ensure the serialization.

21 Claims, 5 Drawing Sheets

SYSTEM AND METHOD FOR SERIALIZING UPDATES TO ANCESTOR SITES IN A DISTRIBUTED DATABASE

TECHNICAL FIELD OF THE INVENTION

The present invention is directed, in general, to distributed databases and, more specifically, to a system and method for serializing updates to ancestor sites in a distributed database.

BACKGROUND OF THE INVENTION

Database systems were first implemented at only a single database site. As the number of distributed applications requiring access to the database increased, the complexity, size and the time required to access the database systems also increased. Shortly thereafter, a single database site became unable to process all the information in a timely manner.

To correct this database processing problem, companies developed new database systems in which the database was replicated at different sites along a network. With the use of replicated databases, distributed applications were able to achieve a higher level of performance, reliability and availability. However, the higher level of performance came with a price.

Replicated databases improved performance, but management of the replicated data became vastly more complicated. Gigabytes of data are replicated in distributed data warehouses and various World Wide Web sites on the Internet. In telecom as well as data networks, network management applications require real-time dissemination of updates to replicas with strong consistency guarantees.

Two broad approaches have been developed to handle the problem of replica updates in a distributed database system, an eager protocol and a lazy protocol. The eager protocol updates all the replicas of an item as part of a single transaction. Thus, an eager protocol ensures that executions are serializable. However, a major disadvantage of an eager protocol's algorithms is that the a number of operations in the transaction increases with the degree of replication, and since deadlock probability is proportional to the fourth power of the transaction size, eager protocols are unlikely to scale beyond a small number of sites.

In contrast, the lazy protocol posts updates to replicas through independent transactions that are spawned by the original updating transaction after it commits. Thus, the effective size of a transaction is reduced and the overall performance of the system improves due to fewer deadlocks. However, transaction execution must be orchestrated carefully to ensure serializability across the entire distributed database.

Due to its superior performance benefits, a number of conventional database management programs (e.g., Sybase®, Oracle®, CA-OpenIngres®) provide support for updating via a lazy protocol. Specifically, these programs provide an option in which each transaction executes locally, and then is propagated asynchronously to replicas after it commits (the replicas at each site are updated in the context of a separate transaction). Since each transaction executes locally and independently, the systems do not require multi-site commit protocols (e.g., two-phase commit) which tend to introduce blocking and are thus not easily scalable.

A problem, however, with the lazy replication approaches of most conventional systems is that they can easily lead to non-serializable executions. For instance, it is possible for the same data item to be concurrently updated at two different sites, thus resulting in an update conflict. Currently, commercial systems use reconciliation rules (e.g., install the update with the later timestamp) to merge conflicting updates. These rules do not guarantee serializability, unless the updates are commutative.

Another problem with lazy replication approaches is that they cannot serialize updates if the distributed database system is described by a cyclic copy graph. Current lazy replication approaches require that the distributed database system be described by a directed acyclic copy graph in order to ensure the serialization. Therefore, what is needed in the art is a way to guarantee serializability of updates within a replicated database system when the distributed database system is described by a cyclic copy graph.

SUMMARY OF THE INVENTION

To address the above-discussed deficiencies of the prior art, the present invention provides a system for, and method of, ensuring serialization of updates from a replica site in a distributed database that is described by a copy graph and a distributed database incorporating the system or the method. In one embodiment, the system includes: (1) a directed acyclic copy graph (DAG) creation module that identifies backedges in, and removes the backedges from, the copy graph to yield a DAG and (2) a propagation module, associated with the DAG creation module, that initially employs eager updating to propagate the updates along the backedges and thereafter employs lazy updating to propagate the updates along edges of the directed acyclic copy graph to ensure the serialization. For purposes of the present invention, a "backedge" is defined as one of a set of edges that, when the set is removed from a cyclic copy graph, yields an acyclic copy graph.

The present invention therefore introduces the broad concept of breaking updates down into two categories: a first involving updates along backedges in which eager updating is employed for speed and serialization, and a second involving a DAG in which lazy updating can be employed without subjecting the database to undue record locking.

In one embodiment of the present invention, the propagation module initially employs the eager updating to propagate the updates only along the backedges. Alternatively, eager updating can be employed with respect to some (but not all) of the edges that are not backedges.

In one embodiment of the present invention, the propagation module performs the eager updating as one atomic transaction. Those skilled in the pertinent art are familiar with atomic transactions affecting both a primary copy and one or more replicas. Alternatively, the eager updating can be performed as more than one atomic transaction.

In one embodiment of the present invention, the propagation module performs the eager updating with timestamps. It is preferable to perform the eager updating with timestamps when the subsequent lazy updating is timestamp-based. The Detailed Description that follows will describe when the propagation module shifts from backedge eager updating to lazy updating within the DAG in the context of timestamp-based updating.

In one embodiment of the present invention, the lazy propagation is performed without timestamps. It is preferable to perform the eager updating without timestamps when the subsequent lazy updating does not employ timestamps. The Detailed Description that follows will describe when the propagation module shifts from backedge eager updating to lazy updating within a forest (to be defined) based on the DAG in the context of timestamp-free updating.

In one embodiment of the present invention, a counterpart of the system is located at each replica of the distributed database. A replica is a site that comprises a copy of the whole database or a site that contains at least one element of the database. Alternatively, the system may be located at a single replica site, or at fewer than all sites.

The foregoing has outlined, rather broadly, preferred and alternative features of the present invention so that those skilled in the art may better understand the detailed description of the invention that follows. Additional features of the invention will be described hereinafter that form the subject of the claims of the it invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
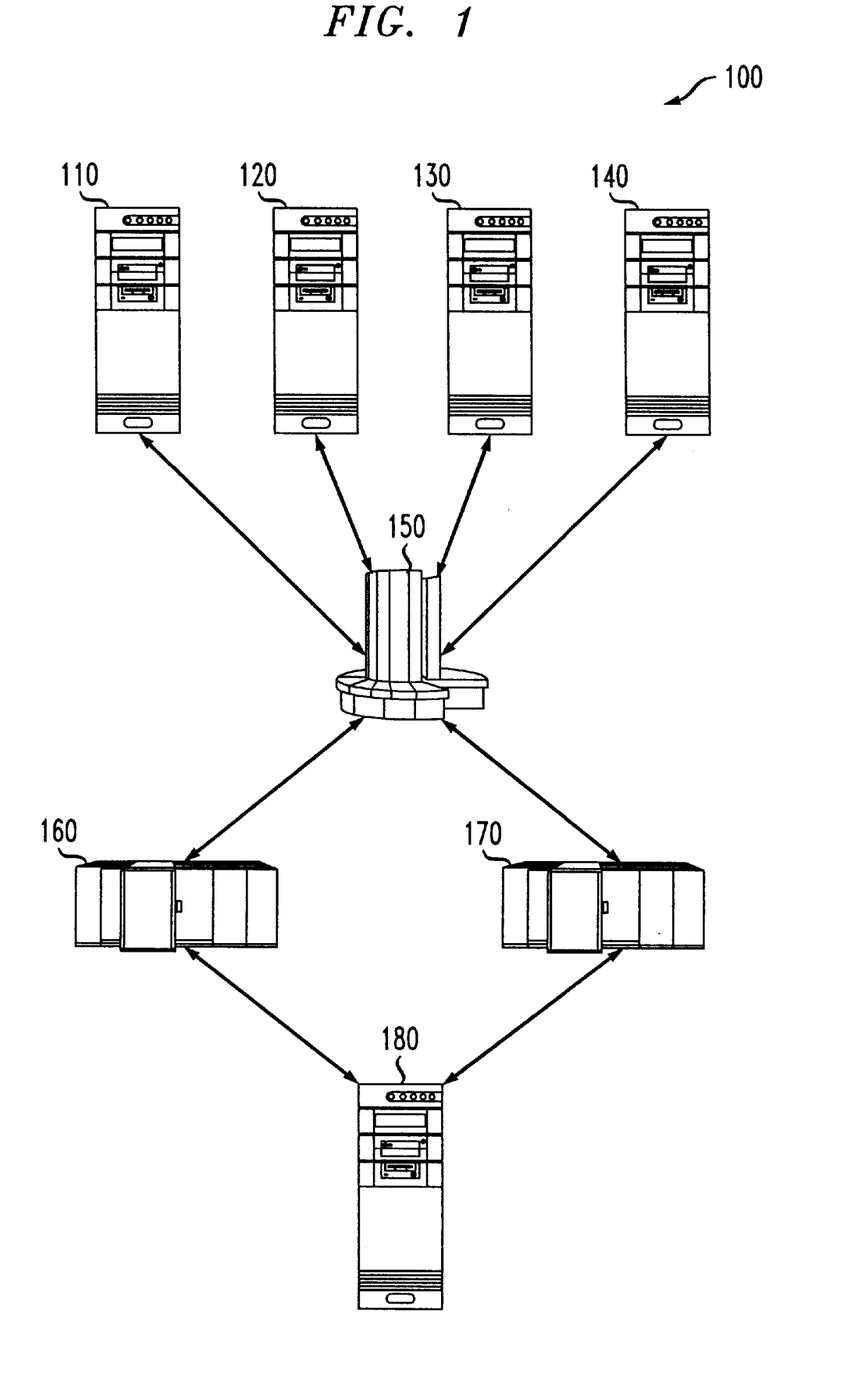
FIG. 1 illustrates a block diagram of a distributed database system that forms one environment within which the present invention can operate.

Referring initially to FIG. 1, illustrated is a block diagram of a distributed database system, generally designated 100, that forms one environment within which the present invention can operate. The distributed database system 100 comprises a plurality of database computer systems operating at remote sites 110, 120, 130, 140, a main database computer system 150, department database computer systems 160, 170 and an analyst computer system 180. In the illustrated embodiment of the present invention, the distributed database system 100 may comprise any number of remote sites 110, 120, 130, 140, main database computer systems 150, department database computer systems 160, 170 and analyst computer systems 180.

The remote sites 110, 120, 130, 140 comprise replicated data and are coupled to the main database computer system 150 via a combination of networks and telecommunications lines. The main database computer system 150 comprises the primary database for the distributed database system 100. In another embodiment of the present invention, the main database computer system 150 comprises a primary database site for a portion of the data within the distributed database system 100.

The main database computer system 150 is also coupled to the department database computer systems 160, 170 via a combination of networks and telecommunications lines. The department database computer systems 160, 170 comprise a secondary site for the replicated data within the distributed database system 100.

The analyst database computer system 180 is coupled to the department database computer system 160 and to the department database computer system 170 via a combination of networks and telecommunications lines. The analyst database computer system 180 comprises replicated data of the distributed database system 100.

In the illustrated embodiment, each of the remote sites 110, 120, 130, 140, the main database computer system 150, the department database computer systems 160, 170 and the analyst database computer system 180 also comprise distributed applications that access data contained within the replicated databases and programs which propagate the transaction updates throughout the distributed database system 100. In another embodiment of the present invention, only the main database computer system 150 and the department database computer systems 160, 170 contain programs which propagate database updates throughout the distributed database system 100.

In a third embodiment of the present invention, any one of the remote sites 110, 120, 130, 140, the main database computer systems 150, the department database computer systems 160, 170 and the analyst computer system 180 may be either the primary site or a secondary site for a plurality of database items in the distributed database system 100. In all cases, only one distributed database site may be the primary site for a particular database item.

Figure 2:
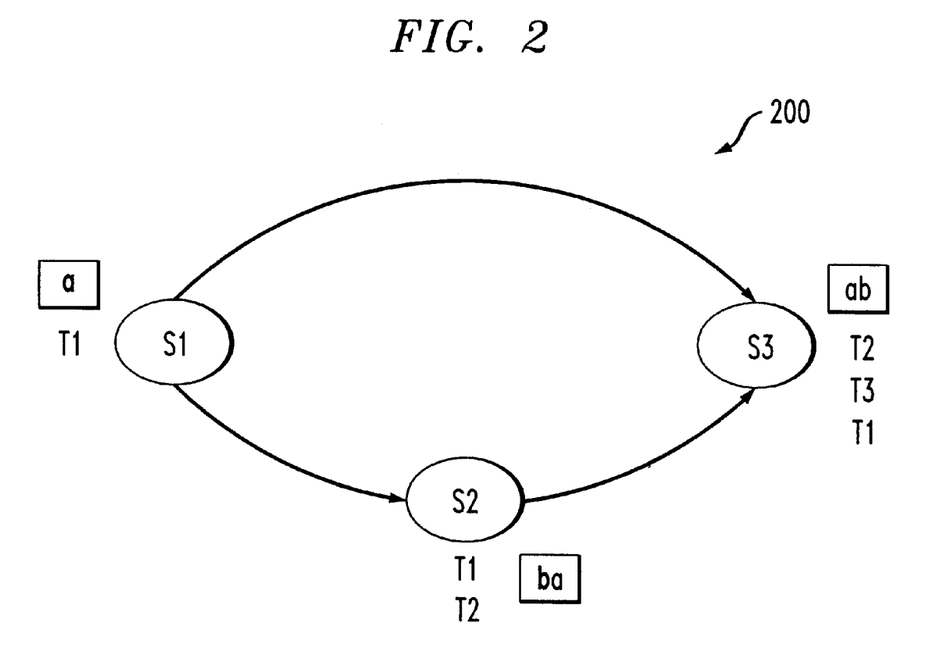
FIG. 2 illustrates a block diagram of a directed acyclic copy graph with non-serializable execution problem.

Turning now to FIG. 2, illustrated is a block diagram of a directed acyclic copy graph ("DAG") with non-serializable execution problem, generally designated 200. The problem of ensuring execution serializability of a copy graph is that existing approaches use lazy replication protocols that guarantee serializability if and only if the undirected graph obtained from a copy graph is acyclic. However, since replica updates are propagated arbitrarily, their algorithms cannot ensure serializability if the copy graph is a directed acyclic copy graph. This non-serializability problem is illustrated by FIG. 2.

Consider the distributed system, shown in FIG. 2, with three sites and two items a and b. The primary site for a is S1 with secondary copies at S2 and S3, while the primary site for b is S2 and a secondary copy is at S3. The copy graph is the DAG 200 as shown in FIG. 2.

Now consider three transactions, T1 at site S1, T2 at site S2 and T3 at site S3. T1 simply updates item a, T2 reads a and writes b while T3 reads both items a and b. Assuming lazy propagation of updates to replicas, it is possible for T1's update to reach site S2 before T2 executes. It is also possible for T1's update to reach site S3 after T2's update to b has been applied and transaction T3 has completed execution. Since T1 is serialized before T2 at site S2, but T2 is serialized before T1 at site S3, applying T1's update would corrupt the replica data at site S3. Therefore, the current lazy propagation protocols cannot guarantee serializability of T1's update at site S3.

Background information concerning copy graphs is discussed in Transaction Processing: Concepts and Techniques by Jim Grey and Andreas Reuter, Morgan Kauffman Publishers 1993. Background information concerning serializability is discussed in Deferred Updates and Data Placement in Distributed Databases by P. Chundi, et al., in Proceedings of the Twelfth International Conference on Data Engineering, New Orleans, La., 1996. The foregoing publications are incorporated herein by reference.

Figure 3:
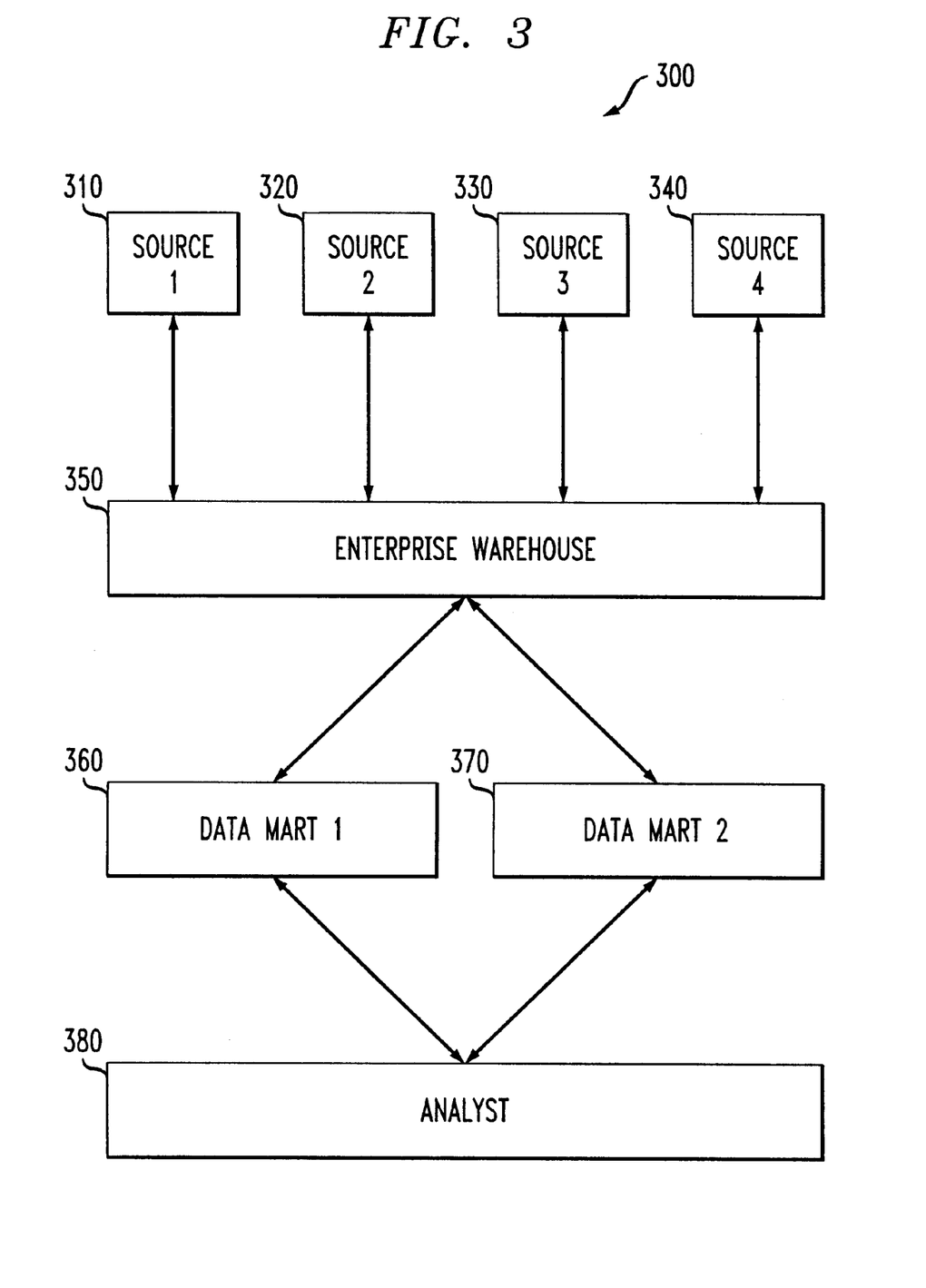
FIG. 3 illustrates a block diagram of a typical data warehousing environment.

Turning now to FIG. 3, illustrated is a block diagram of a typical data warehousing environment, generally designated 300. The data warehousing environment 300 is one example of a natural situation in which the copy graph for propagating updates is a DAG.

The data warehousing environment 300 typically comprises sources 310, 320, 330, 340, an enterprise warehouse 350, data marts 360, 370 and an analyst 380. The sources 310, 320, 330, 340 are coupled to the enterprise warehouse 350. The sources 310, 320, 330, 340 collect data from the warehousing environment and send the data to the enterprise warehouse 350 via a network (not shown).

The enterprise warehouse 350 comprises a primary copy of the distributed database and programs that collect and propagate replica updates. The enterprise warehouse 350 is also coupled to the data marts 360, 370 via a network. The enterprise warehouse 350 collects updates from the sources 310, 320, 330, 340 and updates the primary database. After updating the primary database, the enterprise warehouse 350 propagates the updates to the other computer systems within the data warehousing environment 300.

The data marts 360, 370 are also coupled via the network (not shown) to the analyst 380 and comprise replica databases and programs that collect and propagate replica updates. The data marts 360, 370 are also the database source for a number of department applications within the data warehouse environment 300. When a department application updates the one of the data marts' replica databases, the corresponding data mart propagates the replica update to the other computer systems within the data warehousing environment 300.

The analyst 380 comprises a replica database and programs that collect and propagate replica updates. The analyst 380 is the local database source for analyst applications within the data warehousing environment 300. When an analyst application updates the analyst's replica database, the analyst 380 propagates the replica update to the other computer systems within the data warehousing environment 300.

In another embodiment of the present invention, any one of the sources 310, 320, 330, 340, the enterprise warehouse 350, the data marts 360, 370 and the analyst 380 may be either the primary site or a secondary site for a plurality of database items in the data warehousing environment 300. In all cases, only one distributed database site may be the primary site for a particular database item.

The current update protocols used in the data warehousing environment refresh the warehouse periodically (e.g., every night), while shutting out queries from the warehouse. Alternately, the current update protocols allow queries on the warehouse and concurrently perform locking at remote sites. Clearly, both are undesirable. One embodiment of the present invention, to be described in FIG. 5, comprises a serialization system which allows the updates to be propagated without either requiring the database to go off-line or requiring transactions to acquire locks at multiple sites.

Figure 4A:
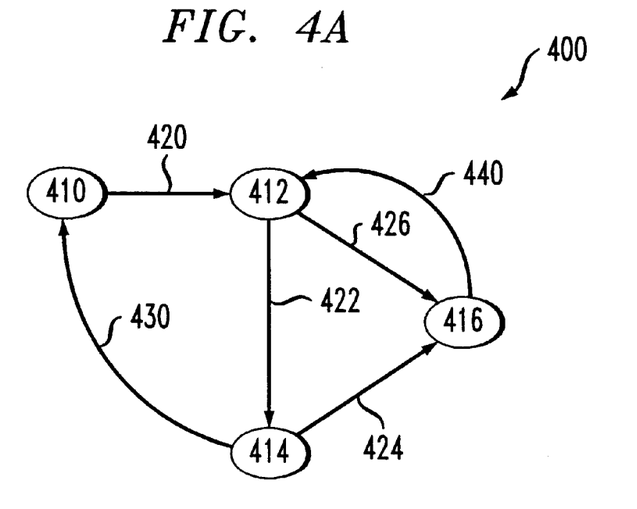
FIG. 4A illustrates an example of a cyclic copy graph that forms one environment within which the present invention can operate.

Turning now to FIG. 4A, illustrated is an example of a cyclic copy graph ("CCG"), generally designated 400, that forms one environment within which the present invention can operate. The CCG 400 comprises four distributed database sites 410, 412, 414, 416 and six edges 420, 422, 424, 426, 430, 440.

The database site 410 is coupled to the database site 412 via edge 420 and propagates transaction updates to the database site 412. The database site 412 is coupled to the database sites 414, 416 via edges 422, 426 respectively and propagates transaction updates to the database sites 414, 416. The database site 414 is coupled to the database sites 410, 416 via edges 430, 424 respectively and propagates transaction updates to the database sites 410, 416. The database site 416 is coupled to the database site 412 via edge 440 and propagates transaction updates to the database site 412.

The CCG 400 also comprises backedges 430, 440. A backedge is defined as one of a set of edges that, when the set is removed from a cyclic copy graph, yields a directed acyclic copy graph. Removing edges 430, 440 from CCG 400 results in a directed acyclic copy graph as shown in FIG. 4B.

The problem with the CCG 400 is that it does not guarantee serializability of replica updates to the database sites using lazy updates since the copy graph is cyclic. In one embodiment of the present invention, the present invention creates a directed acyclic copy graph from the CCG 400, as shown in FIG. 4B, and propagates updates along the backedges of CCG 400 and then uses lazy updates to propagate updates along the edges of the DAG to guarantee serializability of transactions.

Figure 4B:
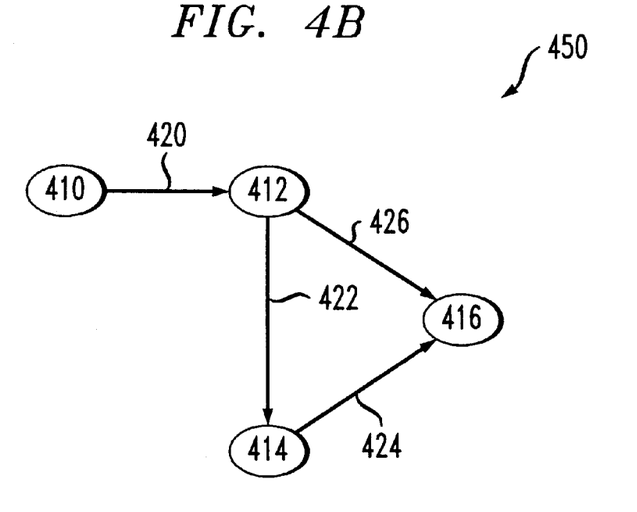
FIG. 4B illustrates a directed acyclic copy graph constructed from the cyclic copy graph in FIG. 4A.

Turning now to FIG. 4B, illustrated is a directed acyclic copy graph ("DAG"), generally designated 450, constructed from the cyclic copy graph 400 in FIG. 4A. The methodology of constructing the DAG 450 from the cyclic copy graph 400 is discussed in greater detail in FIG. 5.

The DAG 450 comprises four distributed database sites 410, 412, 414, 416 and four edges 420, 422, 424, 426. The database site 410 is coupled to the database site 412 via edge 420 and propagates transaction updates to the database site 412. The database site 412 is coupled to the database sites 414, 416 via edges 422, 426 respectively and propagates transaction updates to the database sites 414, 416. The database site 414 is coupled to the database site 416 via edge 424 and propagates transaction updates to the database site 416.

Figure 5:
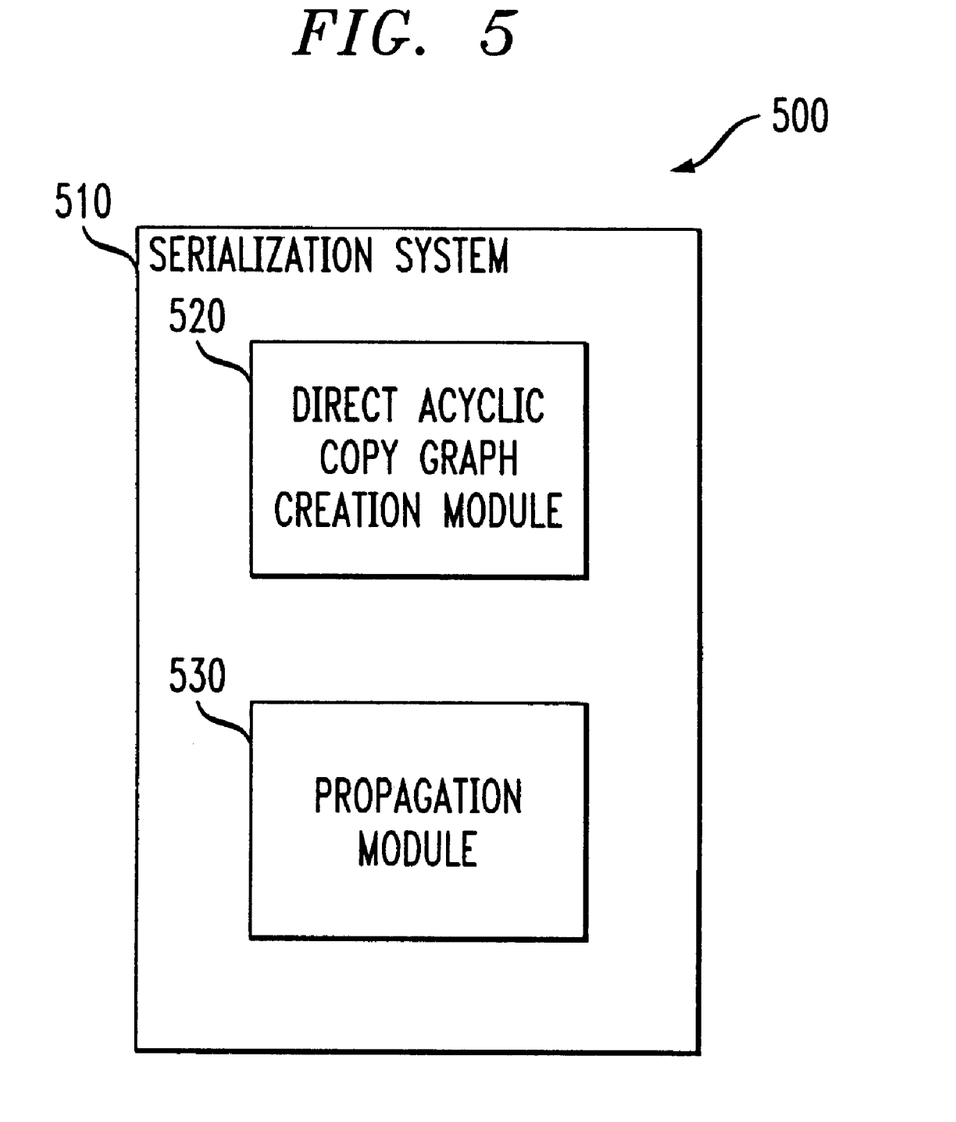
FIG. 5 illustrates a block diagram of a serialization system that ensures serialization of updates in a distributed database system described by a cyclic copy graph.

Turning now to FIG. 5, illustrated is a block diagram of a serialization system 510 that ensures serialization of updates in a distributed database system described by a cyclic copy graph. The serialization system 510 comprises a directed acyclic copy graph ("DAG") creation module 520 and a propagation module 530.

The DAG creation module 520 creates a directed acyclic copy graph from a cyclic copy graph. For example, the DAG creation module 520 starts with the CCG 400 in FIG. 4A and creates the DAG 450 shown in FIG. 4B. The DAG creation module 520 creates a DAG by first determining the backedges of the cyclic copy graph. A backedge is defined as one of a set of edges that, when the set is removed from a cyclic copy graph, yields a directed acyclic copy graph. In this example, the CCG 400 has two backedges 430, 440.

Next, the DAG creation module 520 removes each of the backedges of the cyclic copy graph resulting in a directed acyclic copy graph. In this example, removing backedges 430, 440 from CCG 400 results in the DAG 450 as shown in FIG. 4B.

In an alternative embodiment of the present invention, the DAG creation module 520 determines the minimal set of backedges to remove based upon an edge weight algorithm in order to minimize the number of times a transaction has to execute a backedge update. The DAG creation module 520 assigns a weight to each edge of a copy graph denoting the frequency in which an update has to be propagated along that edge. Then, the DAG creation module 520 20 determines the minimal set of backedges whose removal will result in a DAG whose summation of edge weights results in a minimal weight.

Associated with the DAG creation module 520 is the propagation module 530. The propagation module 530 propagates updates using a combination of eager updates and lazy updates to ensure serialization of a cyclic copy graph. The propagation module 530 uses eager updates along the backedges of the cyclic copy graph and then uses lazy updates for the DAG constructed by the DAG creation module 520.

A transaction that occurs at the single site is referred to as a primary sub-transaction. If a transaction needs to be applied to the ancestor sites of the single site along backedges, these transactions are called backedge sub-transactions. The transaction's updates that are forwarded to the other distributed database sites are called secondary sub-transactions.

If a distributed database site in a cyclic copy graph has a backedge and requires backedge sub-transactions, the propagation module 530 first executes a primary sub-transaction at that distributed database site. However, the propagation module 530 does not allow the primary sub-transaction to commit or to release its locks. Next, the propagation module 530 propagates the primary sub-transaction's updates to the required ancestor sites along the backedges.

The propagation module 530 executes the primary sub-transaction's updates at the first required ancestor site but does not commit or release its locks at that ancestor site. Next, the propagation module, without releasing the previous locks, propagates the primary sub-transaction's updates to the next required ancestor site and executes the primary sub-transaction's updates without committing or releasing its locks at that site.

The propagation module 530 continues propagating the primary sub-transaction's updates to all of the single site's required ancestor sites. Once all the required ancestor sites have been updated, the updated sites commit and release there locks. In an alternate embodiment of the present invention, the propagation module 530 performs the eager updating of the backedge sub-transactions using timestamps.

Next, the propagation module 530 propagate the secondary sub-transactions to the other database sites in the copy graph using a lazy update protocol. Since lazy update protocols require the use of a DAG to ensure serialization, the propagation module 530 uses the DAG created by the DAG creation module 520 to propagate the secondary sub-transactions. In one embodiment of the present invention, the propagation module 530 uses a lazy update protocol without timestamps to ensure serialization of the DAG created by the DAG creation module 520. The propagation module uses the system and methods described in the related co-pending application of Breitbart, et al., for a "System and Method for Serializing Lazy Updates in a Distributed Database Without Requiring Timestamps."

In an alternate embodiment of the present invention, the propagation module 530 uses a lazy update protocol with timestamps to ensure serialization of the DAG created by the DAG creation module 520. The propagation module uses the system and methods described in the related co-pending application of Breitbart, et al., for a "Timestamp-Based System and Method for Serializing Lazy Updates in a Distributed Database."

For example, consider a single site transaction at the database site 414 in FIG. 4A. The propagation module 530 uses eager updates to propagate the transaction along the backedges of the CCG 400. In using eager updates, the propagation module 530 first executes the transaction at site 414 but does not commit or release its locks. Next, the propagation module 530 propagates the transaction to the required ancestor site 410. The propagation module 530 executes the transaction at ancestor site 410 but does not commit or release its locks.

Next the propagation module 530 propagates the transaction to the next required ancestor site 412. At the ancestor site 412, the propagation module 530 executes the transaction but does not commit or release its locks. Since there are no more required ancestor sites to update, the propagation module 530 causes the transactions to commit at sites 410, 412, 414 and releases all of the locks previously held.

Once the transactions have committed and all the locks have been release, the propagation module 530 uses lazy updates to propagate the transaction's updates to the remaining database sites in the copy graph. In performing the lazy updates, the propagation module 530 uses the DAG 450 created by the DAG creation module 520 and a lazy update protocol best suited for the distributed database system. Since there is only site left to be updated, the propagation module 530 can apply either of the previously described lazy update protocols.

One skilled in the art should know that the present invention is not limited to using the lazy update protocols previously described to propagate lazy updates within a DAG. Nor is the present invention limited to the cyclic copy graph and the directed acyclic copy graph shown in FIG. 4A and FIG. 4B respectively. Also, other methods of constructing a DAG from a cyclic copy graph are within the scope of this invention. Other embodiments of the present invention may have additional or fewer steps than described above.

Although the present invention has been described in detail, those skilled in the art should understand that they can make various changes, substitutions and alterations herein without departing from the spirit and scope of the invention in its broadest form.

What is claimed is:

1. A system for ensuring serialization of updates from a replica site in a distributed database that is described by a copy graph, comprising:
    a directed acyclic copy graph (DAG) creation module that identifies backedges in, and removes said backedges from, said copy graph to yield a DAG; and
    a propagation module, associated with said DAG creation module, that initially employs eager updating to propagate said updates along said backedges and thereafter employs lazy updating to propagate said updates along edges of said directed acyclic copy graph to ensure said serialization.

2. The system as recited in claim 1 wherein said propagation module initially employs said eager updating to propagate said updates only along said backedges.

3. The system as recited in claim 1 wherein said propagation module performs said eager updating as one atomic transaction.

4. The system as recited in claim 1 wherein said propagation module performs said eager updating with timestamps.

5. The system as recited in claim 1 wherein said lazy propagation is timestamp-based.

6. The system as recited in claim 1 wherein said lazy propagation is performed without timestamps.

7. The system as recited in claim 1 wherein a counterpart of said system is located at each replica of said distributed database.

8. A method of ensuring serialization of updates from a replica site in a distributed database that is described by a copy graph, comprising:

identifying backedges in said copy graph;

removing said backedges from said copy graph to yield a DAG;

initially employing eager updating to propagate said updates along said backedges; and thereafter employing lazy updating to-propagate said updates along edges of said directed acyclic copy graph to ensure said serialization.

9. The method as recited in claim 8 wherein initially employing comprises employing said eager updating to propagate said updates only along said backedges.

10. The method as recited in claim 8 wherein said thereafter employing comprises employing performing said eager updating as one atomic transaction.

11. The method as recited in claim 8 wherein said initially employing comprises performing said eager updating with timestamps.

12. The method as recited in claim 8 wherein said lazy propagation is timestamp-based.

13. The method as recited in claim 8 wherein said thereafter employing comprises performing said lazy propagation without timestamps.

14. The method as recited in claim 8 wherein said method is carried out at each replica of said distributed database.

15. A distributed database described by a copy graph, comprising:

at least one primary site;

at least two secondary sites; and a system for ensuring serialization of lazy updates among said at least one primary site and said at least two secondary sites, including:

a directed acyclic copy graph (DAG) creation module that identifies backedges in, and removes said backedges from, said copy graph to yield a DAG, and a propagation module, associated with said DAG creation module, that initially employs eager updating to propagate said updates along said backedges and thereafter employs lazy updating to propagate said updates along edges of said directed acyclic copy graph to ensure said serialization.

16. The distributed database as recited in claim 15 wherein said propagation module initially employs said eager updating to propagate said updates only along said backedges.

17. The distributed database as recited in claim 15 wherein said propagation module performs said eager updating as one atomic transaction.

18. The distributed database as recited in claim 15 wherein said propagation module performs said eager updating with timestamps.

19. The distributed database as recited in claim 15 wherein said lazy propagation is timestamp-based.

20. The distributed database as recited in claim 15 wherein said lazy propagation is performed without timestamps.

21. The distributed database as recited in claim 15 wherein a counterpart of said system is located at each replica of said distributed database.

* * * * *